US010228266B1

(12) United States Patent
McGruder et al.

(10) Patent No.: US 10,228,266 B1
(45) Date of Patent: Mar. 12, 2019

(54) FENESTRATION UNIT MONITORING DEVICES AND METHODS

(71) Applicant: ANDERSEN CORPORATION, Bayport, MN (US)

(72) Inventors: Ross McGruder, St. Paul, MN (US); Chris Buege, Marine on St. Croix, MN (US)

(73) Assignee: ANDERSEN CORPORATION, Bayport, MN (US)

( * ) Notice: Subject to any disclaimer, the term of this patent is extended or adjusted under 35 U.S.C. 154(b) by 473 days.

(21) Appl. No.: 14/983,750

(22) Filed: Dec. 30, 2015

Related U.S. Application Data

(60) Provisional application No. 62/099,898, filed on Jan. 5, 2015.

(51) Int. Cl.

| | |
|---|---|
| ***E05B 45/06*** | (2006.01) |
| ***G01D 5/12*** | (2006.01) |
| ***E06B 7/00*** | (2006.01) |
| ***H01H 36/00*** | (2006.01) |
| ***H01H 11/00*** | (2006.01) |
| ***G08B 13/08*** | (2006.01) |

(52) U.S. Cl.
CPC ................. *G01D 5/12* (2013.01); *E06B 7/00* (2013.01); *G08B 13/08* (2013.01); *H01H 11/005* (2013.01); *H01H 36/0033* (2013.01)

(58) Field of Classification Search
CPC .. G01D 5/12; E06B 7/00; G08B 13/08; G08B 25/009
USPC .......................................................... 340/542
See application file for complete search history.

(56) References Cited

U.S. PATENT DOCUMENTS

| | | | |
|---|---|---|---|
| 3,525,830 | A | 8/1970 | Hawkins |
| 3,641,540 | A | 2/1972 | Cutler et al. |
| 4,196,422 | A | 4/1980 | Swigert et al. |
| 4,336,518 | A | 6/1982 | Holce et al. |
| 4,346,372 | A | 8/1982 | Sandberg |
| 4,360,803 | A | 11/1982 | Heiland |
| 4,381,504 | A | 4/1983 | Bitko |
| 4,456,897 | A | 6/1984 | Holce et al. |
| 4,465,997 | A | 8/1984 | Hines |
| 4,755,799 | A | 7/1988 | Romano |
| 4,760,380 | A | 7/1988 | Quenneville et al. |
| 4,845,471 | A | 7/1989 | Chu |

(Continued)

OTHER PUBLICATIONS

U.S. Appl. No. 14/983,754, filed Dec. 30, 2015, Andersen Corp.

*Primary Examiner* — John A Tweel, Jr.
(74) *Attorney, Agent, or Firm* — Mueting, Raasch & Gebhardt, P.A.

(57) ABSTRACT

Fenestration unit monitoring devices described herein are configured to retrofit an existing fenestration unit lock assembly to incorporate components that are capable of monitoring the locked or unlocked status of the existing fenestration unit lock assembly and/or the panel position status of a movable panel of the fenestration unit. The fenestration unit monitoring devices include a monitor housing configured for mounting on the surface of a frame member on which a fenestration unit lock assembly is already mounted. The monitor housing of the fenestration unit monitoring device includes a lock cavity such that a portion of the fenestration unit lock assembly is located in the lock cavity formed between the monitor housing and the surface of a frame member to which the monitor housing is mounted.

20 Claims, 9 Drawing Sheets

(56) References Cited

U.S. PATENT DOCUMENTS

| | | | |
|---|---|---|---|
| 5,006,766 | A | 4/1991 | Yuhas et al. |
| 5,077,547 | A | 12/1991 | Burgmann |
| 5,155,460 | A | 10/1992 | Huckins et al. |
| 5,226,256 | A | 7/1993 | Fries et al. |
| 5,311,168 | A | 5/1994 | Pease, Jr. et al. |
| 5,355,059 | A | 10/1994 | McMillan |
| 5,373,716 | A | 12/1994 | MacNeil et al. |
| 5,449,987 | A | 9/1995 | McMillan |
| 5,479,151 | A | 12/1995 | Lavelle et al. |
| 5,486,812 | A | 1/1996 | Todd |
| 5,499,014 | A | 3/1996 | Greenwaldt |
| 5,595,075 | A | 1/1997 | Chen |
| 5,656,982 | A | 8/1997 | Kurahara |
| 5,686,890 | A | 11/1997 | Ko |
| 5,712,621 | A | 1/1998 | Andersen |
| 5,783,995 | A | 7/1998 | Jackson |
| 5,841,361 | A | 11/1998 | Hoffman |
| 5,999,095 | A | 12/1999 | Earl et al. |
| 6,057,769 | A | 5/2000 | Stevenson |
| 6,078,269 | A | 6/2000 | Markwell et al. |
| 6,161,881 | A | 12/2000 | Babka et al. |
| 6,212,923 | B1 | 4/2001 | Clark |
| 6,420,973 | B2 | 7/2002 | Acevedo |
| 6,441,735 | B1 | 8/2002 | Marko et al. |
| 6,615,629 | B2 | 9/2003 | Bates et al. |
| 6,661,340 | B1 | 12/2003 | Saylor et al. |
| 6,724,316 | B2 | 4/2004 | Addy et al. |
| 6,778,086 | B2 | 8/2004 | Morrone et al. |
| 6,853,145 | B2 | 2/2005 | Kang et al. |
| 6,871,885 | B2 | 3/2005 | Goldenberg et al. |
| 6,888,459 | B2 | 5/2005 | Stilp |
| 6,963,280 | B2 | 11/2005 | Eskildsen |
| 6,968,646 | B2 | 11/2005 | Goldenberg et al. |
| 6,987,450 | B2 | 1/2006 | Marino et al. |
| 7,019,639 | B2 | 3/2006 | Stilp |
| 7,023,341 | B2 | 4/2006 | Stilp |
| 7,042,353 | B2 | 5/2006 | Stilp |
| 7,053,764 | B2 | 5/2006 | Stilp |
| 7,057,512 | B2 | 6/2006 | Stilp |
| 7,068,162 | B2 | 6/2006 | Maple et al. |
| 7,079,020 | B2 | 7/2006 | Stilp |
| 7,079,034 | B2 | 7/2006 | Stilp |
| 7,084,756 | B2 | 8/2006 | Stilp |
| 7,091,827 | B2 | 8/2006 | Stilp |
| 7,119,658 | B2 | 10/2006 | Stilp |
| 7,119,678 | B2 | 10/2006 | Katz |
| 7,120,795 | B2 | 10/2006 | Raphael et al. |
| 7,142,111 | B2 | 11/2006 | Eskildsen et al. |
| D534,146 | S | 12/2006 | Stilp et al. |
| 7,147,255 | B2 | 12/2006 | Goldenberg et al. |
| D534,519 | S | 1/2007 | Stilp et al. |
| 7,158,029 | B1 | 1/2007 | Martyn |
| 7,202,789 | B1 | 4/2007 | Stilp |
| 7,227,463 | B2 | 6/2007 | Merrell |
| 7,230,532 | B2 | 6/2007 | Albsmeier et al. |
| 7,355,515 | B2 | 4/2008 | Lee et al. |
| 7,753,418 | B2 | 7/2010 | Fleming |
| 8,193,935 | B2 * | 6/2012 | Gates ..................... G08B 13/08 340/539.22 |
| 8,456,305 | B2 * | 6/2013 | Gates ................... G08B 25/009 340/542 |
| 8,624,736 | B2 | 1/2014 | Gore et al. |
| 8,640,384 | B2 * | 2/2014 | Curtis ....................... E05B 7/00 49/395 |
| 2006/0192396 | A1 | 8/2006 | Frolov et al. |
| 2007/0080541 | A1 | 4/2007 | Fleming |
| 2007/0194914 | A1 | 8/2007 | Gates |
| 2016/0221501 | A1 | 8/2016 | Linden et al. |
| 2018/0058105 | A1 | 3/2018 | Van Klompenburg et al. |

* cited by examiner

FENESTRATION UNIT MONITORING DEVICES AND METHODS

RELATED APPLICATION

This application claims the benefit under 35 U.S.C. Section 119 of U.S. Provisional Patent Application Ser. No. 62/099,898 entitled "FENESTRATION UNIT MONITORING DEVICES AND METHODS" and filed on Jan. 5, 2015, which is incorporated herein by reference in its entirety.

Fenestration unit monitoring devices and methods of installing the same are described herein.

Building security systems can vary in complexity from simple burglar alarms triggered by breakage of windows or other fenestration members, to comprehensive intrusion detection systems that collect data from video cameras, laser beams, infrared sensors, microphones, etc., analyze the data, and communicate information to a variety of destinations, such as security stations and automated building control centers.

Some examples of status monitoring devices that may be used to monitor the status of fenestration locks and the open or closed state of fenestration units are described in U.S. Pat. No. 8,624,736 to Gore et al. Although those devices, systems, and methods are useful, retrofitting an existing fenestration unit having an existing fenestration unit lock assembly located thereon may present challenges.

SUMMARY

The fenestration unit monitoring devices described herein are configured to retrofit an existing fenestration unit lock assembly to incorporate components that are capable of monitoring the locked or unlocked status of the existing fenestration unit lock assembly and/or the panel position status of a movable panel of the fenestration unit.

The fenestration unit monitoring devices described herein may provide, in one or more embodiments, a relatively easy and aesthetically pleasing option to monitor the block status and/or panel status of an existing fenestration unit with an existing fenestration unit lock assembly already located thereon. In one or more embodiments, the fenestration unit monitoring device includes a monitor housing configured for mounting on the surface of a frame member on which a fenestration unit lock assembly is already mounted.

In one or more embodiments, the fenestration unit monitoring devices described herein include a monitor housing that, when in position over an existing fenestration unit lock assembly, uses one or more of the fastener openings already present in used to secure the fenestration unit lock assembly, thereby avoiding the need for drilling or making other modifications to the fenestration unit to attach the fenestration unit monitoring device (although it should be understood that in one or more alternative embodiments, one or more new fastener openings may be used to attach a monitor housing of a fenestration monitoring device as described herein). In one or more alternative embodiments, the fenestration unit monitoring device described herein include a monitor housing that may be positioned using a snap-on or snap fit mechanical attachment, adhesives, tapes, etc.

The use of a monitor housing that is attached without requiring the creation of new openings in a fenestration unit for fasteners may, in one or more embodiments, be particularly useful in avoiding the potential impact on a manufacturer's warranty of the fenestration unit itself which may be voided if modification such as additional openings are drilled into components of the fenestration unit itself to secure a fenestration unit monitoring device to the fenestration unit.

In one aspect, one or more embodiments of a fenestration unit monitoring device configured for retrofitting an existing fenestration unit lock assembly may include: a monitor housing configured for mounting on a surface of a frame member of a first panel after a fenestration unit lock assembly is mounted on the surface of the frame member, monitor housing comprising: a lock cavity defined between the monitor housing and the surface of the frame member when the monitor housing is mounted on the surface of the frame member, wherein a portion of the fenestration unit lock assembly is located in the lock cavity formed between the monitor housing and the surface of the frame member when the monitor housing is mounted on the surface of the frame member; optionally, a monitor fastener opening configured to align with a lock assembly fastener opening of the fenestration unit lock assembly when the monitor housing is mounted on the surface of the frame member with the portion of a fenestration unit lock assembly located in the lock cavity, wherein a single fastener can extend through both the monitor fastener opening and the lock assembly fastener opening to secure both the monitor housing and the fenestration unit lock assembly to the frame member of the first panel; a controller cavity located between the monitor housing and the surface of the frame member when the monitor housing is mounted on the surface of the frame member; a lock arm sensor operably attached to monitor housing, the lock arm sensor positioned to detect the presence of a lock arm of the fenestration unit lock assembly when the lock arm is in a locked position associated with a locked state of the fenestration unit lock assembly; a panel position sensor located in the controller cavity of the monitor housing, the panel position sensor configured to detect a position of a second panel of the fenestration unit relative to the first panel; and a controller located in the controller cavity of the monitor housing, wherein the controller is operably connected to the lock arm sensor and the panel position sensor. In one or more embodiments, the controller is configured to: receive a lock signal from the lock arm sensor when the lock arm of the fenestration unit lock assembly is in the locked position associated with the locked state of the fenestration unit lock assembly; receive a panel position signal from the panel position sensor when the panel position sensor detects presence of the second panel; and provide an indication of a status of one or both of the lock signal and the panel position signal.

In one or more embodiments of the fenestration unit monitoring devices described herein, the device further comprises a transmitter located in the controller cavity and operably connected to the controller, wherein providing an indication of the status of one or both of the lock signal and the panel position signal comprises actuating the transmitter to transmit one or more control signals, wherein the one or more control signals are indicative of the status of one or both of the lock signal and the panel position signal. In one or more embodiments, the transmitter is operably connected to an antenna, and wherein the antenna is located entirely between the monitor housing and the surface of the frame member of the first panel. In one or more embodiments, the transmitter is operably connected to an antenna, and wherein the antenna is located entirely within the controller cavity.

In one or more embodiments of the fenestration unit monitoring devices described herein, the fenestration unit monitoring device comprises a trigger component mounted on the frame member of the second panel, wherein the panel position sensor is configured to detect the position of the second panel relative to the first panel by detecting the trigger component.

In one or more embodiments of the fenestration unit monitoring devices described herein, the lock arm of the fenestration unit lock assembly is attached to the frame member of the first panel, wherein the fenestration unit lock assembly comprises a keeper mounted on a frame member of the second panel, wherein the trigger component is contained within a trigger component housing, wherein the trigger component housing is located over a portion of the keeper such that the portion of the keeper is located between the trigger component housing and the frame member of the second panel, and further wherein the trigger component housing comprises a trigger housing fastener opening that aligns with a keeper fastener opening of the keeper such that a fastener can extend through both the trigger housing fastener opening and the keeper fastener opening.

In one or more embodiments of the fenestration unit monitoring devices described herein, the fenestration unit lock assembly occupies a lock assembly footprint on the surface of the frame member of the first panel, and wherein a portion of the controller cavity is located over the lock assembly footprint.

In one or more embodiments of the fenestration unit monitoring devices described herein, the lock arm sensor comprises a proximity sensor configured to detect the presence of a lock arm of the fenestration unit lock assembly when the lock arm is in the locked position.

In one or more embodiments of the fenestration unit monitoring devices described herein, the lock arm sensor comprises a contact switch configured to move towards the surface of the frame member on which the monitor housing is mounted when the lock arm of the fenestration unit lock assembly is in the locked position.

In one or more embodiments of the fenestration unit monitoring devices described herein, the lock arm of the fenestration unit lock assembly is attached to the frame member of the first panel and wherein the lock arm rotates into and out of the locked position.

In one or more embodiments of the fenestration unit monitoring devices described herein, the device further comprises a tamper switch movable into and out of a tampered state, wherein the tamper switch is not in the tampered state when the monitor housing is attached to the frame member of the first panel, wherein the tamper switch is operably connected to the controller, and wherein the controller is configured to receive a tamper signal from the tamper switch when the tamper switch is in the tampered state.

In a second aspect, one or more embodiments of methods of installing a fenestration unit monitoring device on a fenestration unit that includes an existing fenestration unit lock assembly may include, as described herein, optionally removing a fastener attaching the fenestration unit lock assembly to a surface of a frame member of a first panel of the fenestration unit; positioning a monitor housing on the surface of the frame member of the first panel (after optionally removing the fastener) such that a portion of the fenestration unit lock assembly is located within a lock cavity of the monitor housing, wherein the lock cavity is defined between the monitor housing and the surface of the frame member when the monitor housing is mounted on the surface of the frame member; and securing the monitor housing and the fenestration unit lock assembly to the frame member (optionally using a fastener extending through a monitor fastener opening in the monitor housing that is aligned with a fastener opening of the fenestration unit lock assembly) after positioning the monitor housing on the surface of the frame member of the first panel.

In one or more embodiments of installing the fenestration unit monitoring devices described herein, the monitor housing comprises a lock arm sensor operably attached to monitor housing, the lock arm sensor positioned to detect the presence of a lock arm of the fenestration unit lock assembly when the lock arm is in a locked position associated with a locked state of the fenestration unit lock assembly.

In one or more embodiments of installing the fenestration unit monitoring devices described herein, the monitor housing comprises a controller located in a controller cavity located between the monitor housing and the surface of the frame member when the monitor housing is mounted on the surface of the frame member, and wherein the monitor housing comprises a panel position sensor located in the controller cavity of the monitor housing, the panel position sensor configured to detect a position of a second panel of the fenestration unit relative to the first panel. In one or more embodiments, the controller receives a lock signal from the lock arm sensor when the lock arm of the fenestration unit lock assembly is in the locked position associated with the locked state of the fenestration unit lock assembly; receives a panel position signal from the panel position sensor when the panel position sensor detects presence of the second panel; and provides an indication of a status of one or both of the lock signal and the panel position signal.

In one or more embodiments of installing the fenestration unit monitoring devices described herein, the method further comprises transmitting one or more control signals indicative of the status of one or both of the lock signal and the panel positon signal using a transmitter operably connected to the controller, wherein the transmitter is located within the controller cavity of the monitor housing. In one or more embodiments, the transmitter is operably connected to an antenna, and wherein the antenna is located entirely between the monitor housing and the surface of the frame member of the first panel. In one or more embodiments, the transmitter is operably connected to an antenna, and wherein the antenna is located entirely within the controller cavity.

In one or more embodiments of installing the fenestration unit monitoring devices described herein, the method further comprises mounting a trigger component to the frame member of the second panel, wherein the panel position sensor is configured to detect the position of the second panel relative to the first panel by detecting the trigger component. In one or more embodiments, the lock arm of the fenestration unit lock assembly is attached to the frame member of the first panel, wherein the fenestration unit lock assembly comprises a keeper mounted on a frame member of the second panel, wherein the trigger component is contained within a trigger component housing, wherein mounting the trigger component housing comprises mounting the trigger component housing over a portion of the keeper such that the portion of the keeper is located between the trigger component housing and the frame member of the second panel, and further wherein the trigger component housing comprises a trigger housing fastener opening that aligns with a keeper fastener opening of the keeper, wherein the method further comprises inserting a fastener through both the trigger housing fastener opening and the keeper fastener opening to secure both the trigger housing and the keeper to the frame member of the second panel.

In one or more embodiments of installing the fenestration unit monitoring devices described herein, the fenestration unit lock assembly occupies a lock assembly footprint on the surface of the frame member of the first panel, and wherein positioning the monitor housing on the surface of the frame member of the first panel comprises locating a portion of the controller cavity over the lock assembly footprint.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein.

Where used herein, the terms "top" and "bottom" are used for reference relative to each other when the fenestration units described herein are properly installed in a building opening.

Where used herein, the terms "exterior" and "interior" are used in a relative sense, e.g., an exterior edge and an interior edge of a sill or any other component describe edges located on opposite sides of the fenestration unit. In other words, an exterior edge could be found within the interior of a building or other structure that would conventionally define an interior and an exterior, while an interior edge could be found outside of a building or other structure that would conventionally define an interior and an exterior.

The above summary is not intended to describe each embodiment or every implementation of the fenestration unit monitoring systems and methods described herein. Rather, a more complete understanding of the invention will become apparent and appreciated by reference to the following Description of Illustrative Embodiments and claims in view of the accompanying figures of the drawing.

DESCRIPTION OF ILLUSTRATIVE EMBODIMENTS

Figure 1:
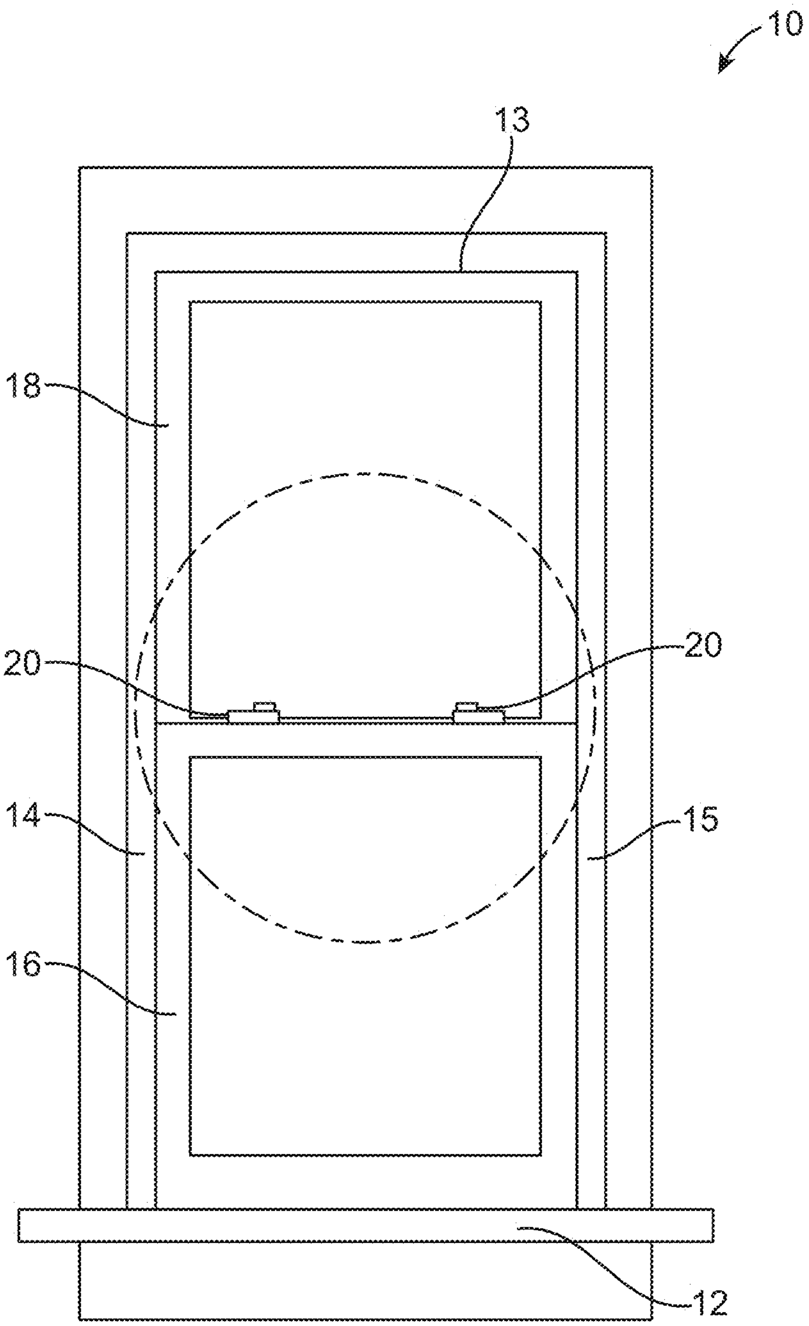
FIG. 1 depicts one illustrative embodiment of a fenestration unit including fenestration unit lock assemblies as described herein.

In the following description of illustrative embodiments, reference is made to the accompanying figures of the drawing which form a part hereof, and in which are shown, by way of illustration, specific embodiments. It is to be understood that other embodiments may be utilized and structural changes may be made without departing from the scope of the present invention.

To facilitate an understanding and explanation of the invention, the elements and numerals as described herein may be referred to with the terms "upper," "lower," "top," "bottom," "front," and "back" to distinguish portions of the device. These conventions are merely included for ease of explanation and understanding and should not be construed as limiting in any manner. The descriptions of the parts detailed herein as "upper," "lower," etc. also can be referred to as "first," "second," etc.

One illustrative embodiment of a fenestration unit 10 is depicted in FIG. 1. Although the illustrative embodiment of fenestration unit 10 is in the form of a single or double hung window, fenestration units with which the fenestration unit monitoring devices described herein may be used include windows and doors such as, e.g., casement windows, awning windows, roof windows, gliding windows, hopper windows, basement/utility windows, sliding patio doors, hinged patio doors, entry doors, garage doors, etc. In one or more embodiments, the fenestration units may include one or more panels (e.g., door panel, window sash, etc.), at least one of which may be movable to open and close the fenestration unit as desired. The movable panels may be mounted for sliding movement, rotational movement, and/or combinations thereof relative the frame members of the fenestration units in which the panels are located.

The illustrative embodiment of fenestration unit 10 includes a frame that is formed by a sill 12, first side jamb 14, second side jamb 15, and head jamb 13 which, in combination, define an opening in the fenestration frame. The frame opening defined within the frame members of the fenestration units includes panels 16 and 18 mounted within the opening in the fenestration unit 10. One or both of the panels 16 and 18 may be mounted for movement relative to the frame members defining the opening such that one or both of the panels 16 and 18 can be moved relative to the frame to close or open at least a portion of the opening to, e.g., allow traffic and/or air to pass through the opening. Windows in which both panels 16 and 18 are movable in a generally vertical direction when the fenestration unit 10 is located in a building opening are commonly referred to as double hung windows. Windows in which only one of the panels 16 or 18 is movable while the other panel remains in a fixed position relative to the frame members are commonly referred to as single hung windows.

Figure 2:
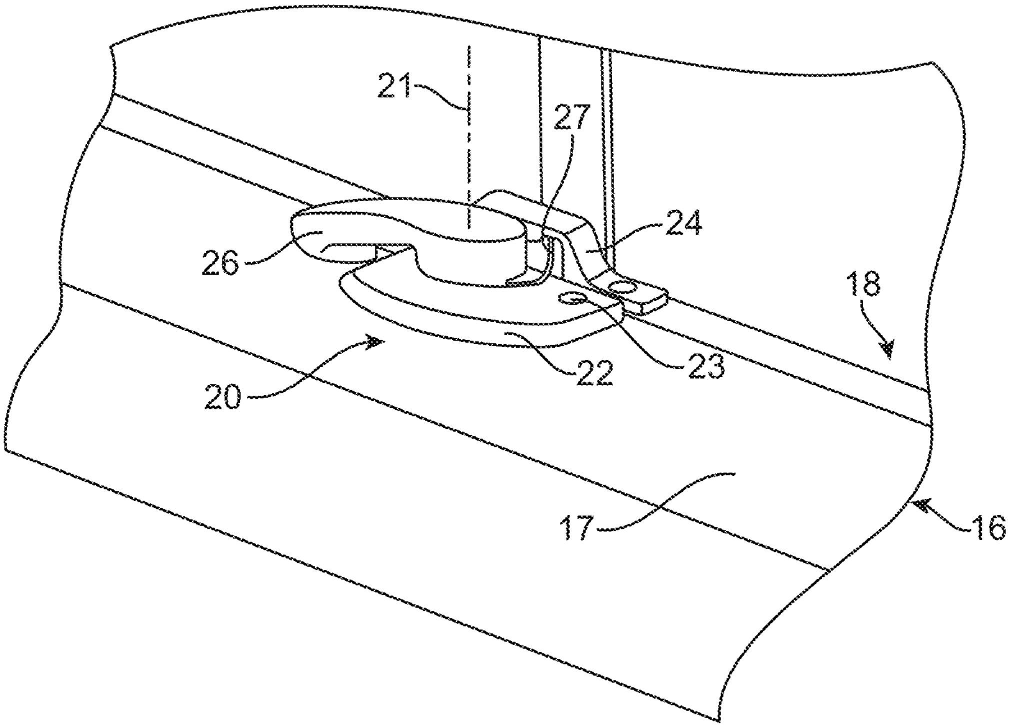
FIG. 2 (PRIOR ART)
FIG. 2 is an enlarged perspective view of a fenestration unit lock assembly mounted on two panels of the fenestration unit 10 before installation of a fenestration unit monitoring device as described herein.

The illustrative embodiment of fenestration unit 10 includes a pair of fenestration unit lock assemblies 20 which may be used to lock the movable panel or panels in the fenestration unit 10 within the frame in the closed position (although it will be understood that in one or more alternative embodiments a single fenestration unit lock assembly 20 may be provided on a fenestration unit as depicted in FIG. 1). An enlarged perspective view of one of the fenestration unit lock assemblies 20 is depicted in FIG. 2. The top rail (sometimes referred to as a check rail) of lower panel 16 overlaps or aligns with the lower rail of upper panel 18 when the fenestration unit is closed, as shown, and the rails move apart when one or both panels 16 and 18 are moved to open the fenestration unit 10. When in the closed position as seen in FIG. 2, the surface 17 of the top rail of the lower panel 16 and the surface 19 of the bottom rail of the upper panel 18 may, in one or more embodiments, be aligned with each other or positioned close to one another in a nearly aligned to state.

The fenestration unit lock assembly 20 includes a base 22 mounted to the surface 17 of the top rail of the lower panel 16 and a keeper 24 mounted on surface 19 of the bottom rail of the upper panel 18. A lock arm 26 and cam 27 are attached to the base 22 and cooperate with the keeper 24 to lock the panels 16 and 18 in position in the fenestration unit 10. In the depicted embodiment, lock arm 26 and cam 27 rotate about axis 21 to move the lock assembly 20 between a locked state and an open state. Fenestration unit lock assemblies such as assembly 20 are conventional and known in the art and will not be further described herein.

Figure 3:
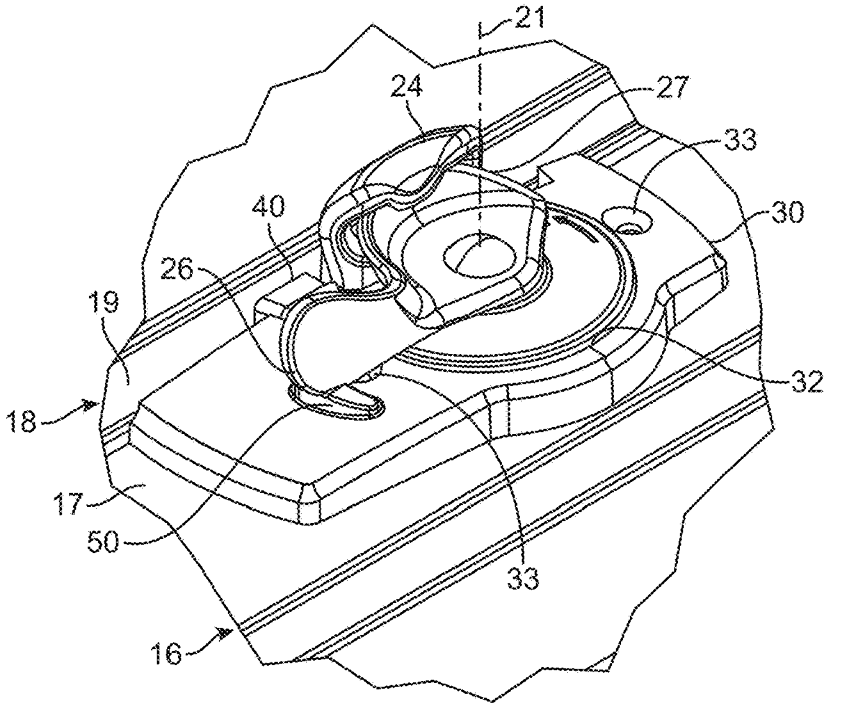
FIG. 3 is a perspective view of the fenestration unit lock assembly of FIG. 2 after installation of one embodiment of a fenestration unit monitoring device as described herein.
Figure 4:
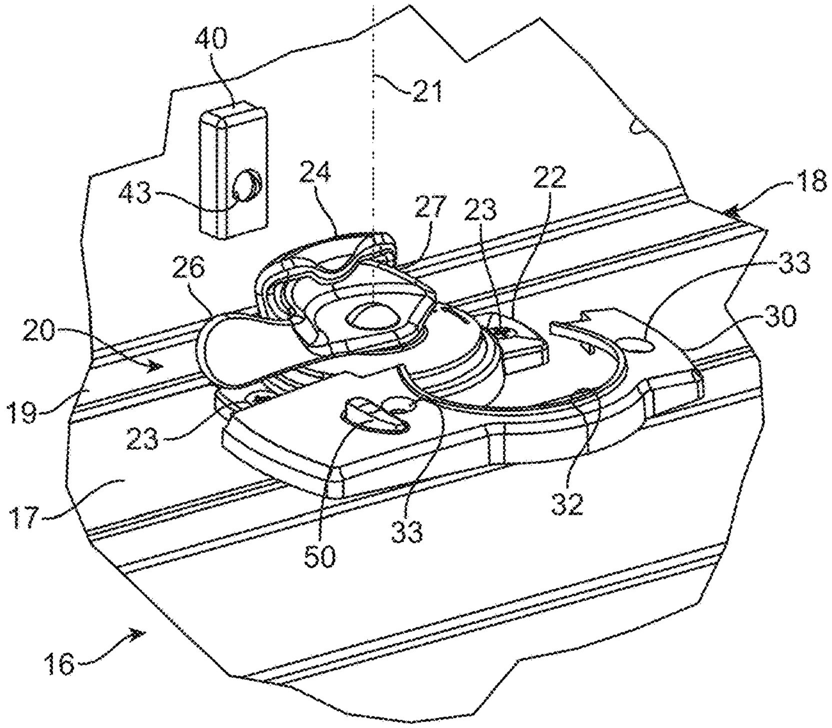
FIG. 4 is an exploded diagram depicting installation of the fenestration unit monitoring device of FIG. 3.
Figure 5:
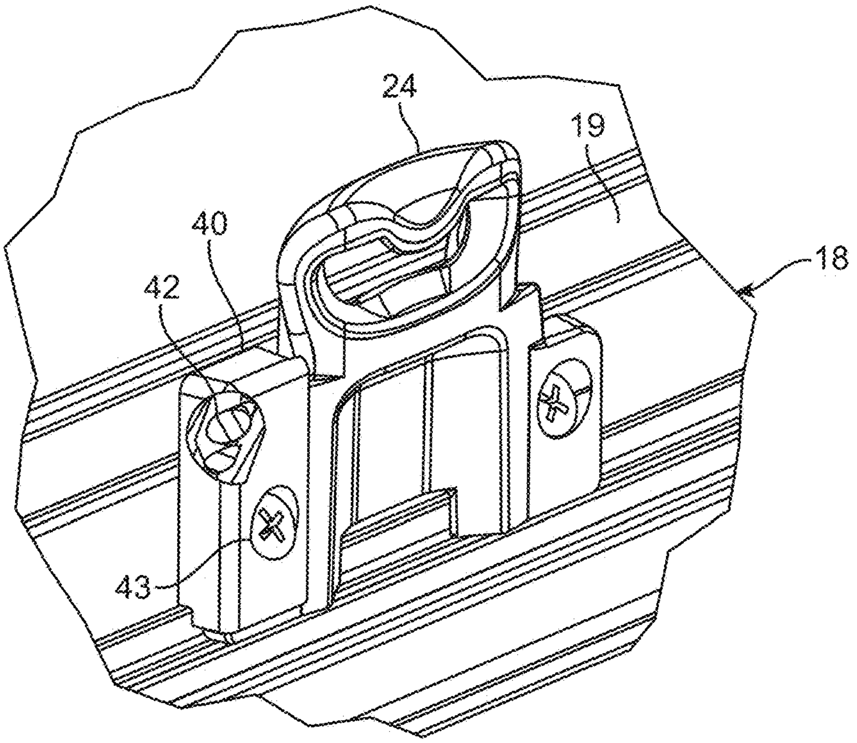
FIG. 5 is a perspective view of one embodiment of a trigger housing and trigger which may be mounted on a keeper of a fenestration unit lock assembly as part of one embodiment of a fenestration unit monitoring device installation as described herein.

With the fenestration unit lock assembly 20 located on the fenestration unit, a fenestration unit monitoring device as described herein may be provided and attached as depicted in FIGS. 3-5.

The illustrative embodiment of the fenestration unit monitoring device depicted in FIGS. 3-5 includes a monitor housing 30 that is configured for mounting on the surface 17 of the frame member of the lower panel 16 after the fenestration unit lock assembly 20 is mounted on the surface 17. In other words, the monitor housing 30 is located over a portion of the lock assembly 20. In one or more embodiments, the monitor housing 30 includes a lock assembly slot 32 such that the base 22 of the lock assembly 20 is received in the lock assembly slot 32 as the monitor housing 30 is positioned over the base 22 of the lock assembly 20.

The monitor housing 30 includes a lock cavity defined between the monitoring housing 30 and the surface 17 of the frame member of the lower panel 16 when the monitor housing 30 is mounted on the surface 17. A portion of the fenestration unit lock assembly 20 is located in the lock cavity formed between the monitor housing and the surface 17. In one or more embodiments such as that depicted in, e.g., FIGS. 3-5, the portion of the lock assembly 20 located in the lock cavity defined by the monitor housing 30 includes the base 22 of the lock assembly 20. In one or more alternative embodiments, other parts of the lock assembly 20, e.g., the lock arm 26, cam 27, etc. may also be fully or partially contained within the lock cavity defined by the monitor housing of a fenestration unit monitoring device as described herein.

When in position over the base 22 of the lock assembly 20, the lock arm 26 and the cam 27 of the lock assembly 20 are, in one or more embodiments, located above the monitor housing 30. In the depicted embodiment, the lock arm 26 rotates over a lock arm sensor 50 that is operably attached to the monitor housing 30 when the lock arm 26 is in a locked position associated with a locked state of the fenestration unit lock assembly 20. Rotation of the lock arm 26 away from the lock arm sensor 50 opens the lock assembly 20 to allow movement of one or both panels 16 and 18 of the fenestration unit 10.

In one or more embodiments, the monitor housing 30 includes one or more fastener openings 33 that are located such that when the monitor housing 30 is in position over the base 22 of the lock assembly 20, the fastener openings 33 in the monitor housing aligned with one or more corresponding fastener openings 23 provided in the base 22 of the lock assembly 20. As a result, in one or more embodiments a single fastener can extend through both a monitor fastener opening 33 and a lock assembly fastener opening 23 to secure both the monitor housing 30 and the base 22 of the fenestration unit lock assembly 20 to the surface 17 of the frame member of the lower panel 16 of the fenestration unit. The fasteners will typically be in the form of threaded screws, bolts, etc. although other mechanical fasteners such as rivets, pins, etc. could be used in place of threaded fasteners.

The fasteners extending through both the monitor fastener opening 33 and an aligned lock assembly fastener opening 23 will, in one or more embodiments, extend into the same bore used to secure the base 22 of the lock assembly 20 to the surface 17 before the monitor housing 30 is positioned over the base 22 of the lock assembly 20. As a result, in one or more embodiments, the monitor housing 30 of the fenestration unit monitoring devices described herein can be secured to the fenestration unit without requiring the drilling or formation of other openings, apertures, etc. that, as described herein, could potentially void a manufacturer's warranty for the fenestration unit 10.

The illustrative embodiment of the fenestration unit monitoring device depicted in FIGS. 3-5 includes a trigger component 42 mounted on the frame member forming surface 19 of the upper panel 18 of the fenestration unit 10. The trigger component 42 may be in the form of, e.g., a magnet, and may further be contained within a trigger component housing 40. In one or more embodiments, the trigger component housing 40 may be located over a portion of the keeper 24 such that the portion of the keeper 24 is located between the trigger component housing 40 and the frame member of the upper panel 18 as seen in, e.g., FIG. 5. In one or more embodiments, the trigger component housing 40 may include a trigger housing fastener opening 43 that aligns with a keeper fastener opening of the keeper 24 such that a fastener can extend through both the trigger housing fastener opening 43 and the fastener opening in the keeper 24 to secure both the trigger housing 40 and the keeper 24 to the frame member of the upper panel 18.

In one or more alternative embodiments, retrofitting an existing fenestration unit lock assembly to include a fenestration unit monitoring device as described herein may involve replacing the entire keeper 24 with an alternative keeper that includes a magnet or other trigger component integrated into the keeper 24 itself such that a separate housing 40 would not be required to provide a trigger that could be used with a panel position sensor of the fenestration unit monitoring devices as described herein.

Figure 6:
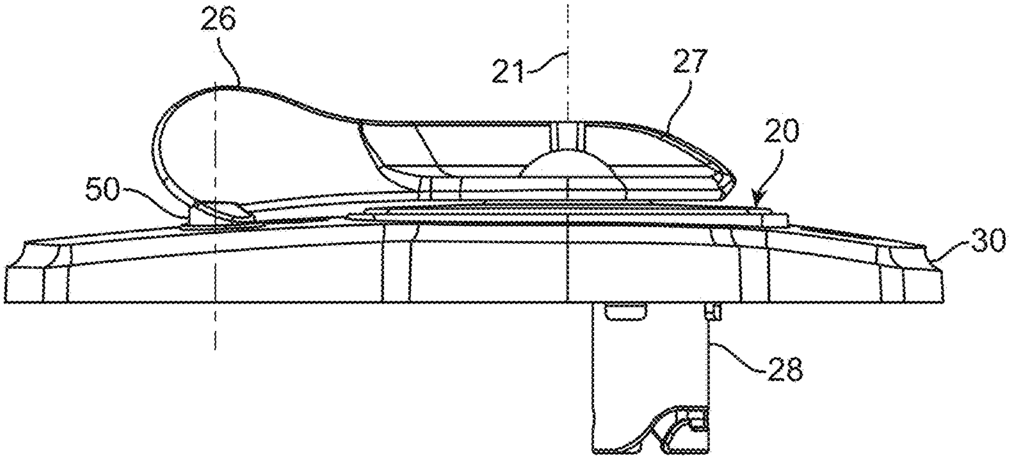
FIG. 6 is a side view of one embodiment of a monitor housing of a fenestration unit monitoring device and fenestration unit lock assembly, with both components being removed from a panel of a fenestration unit.
Figure 7:
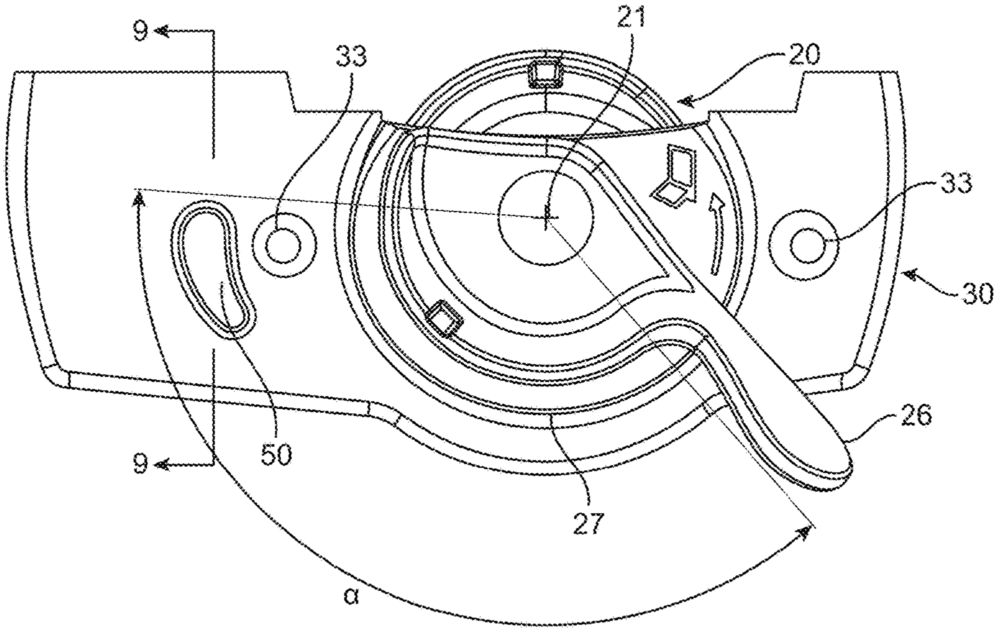
FIG. 7 is a top view of the monitor housing of a fenestration unit monitoring device and fenestration unit lock assembly as depicted in FIG. 6.

The illustrative embodiment of the fenestration unit monitoring device as depicted in FIGS. 3-5 on a fenestration unit is depicted along with a portion of the fenestration unit lock assembly after removal from the fenestration unit in FIGS. 6-7. The monitor housing 30 of the fenestration unit monitoring device is depicted as assembled with the base 22 of the fenestration unit lock assembly 20 to illustrate the arrangement of the lock cavity and the controller cavity formed by the monitor housing 30 as described herein.

Referring to FIG. 6, the monitor housing 30 and lock assembly 20 are shown in a side view where the base of the lock assembly 20 is obscured by the monitor housing 30 but the lock arm 26 and cam 27 of the lock assembly 20 are depicted as being located above the monitor housing 30. Also seen in this view are the lock arm sensor 50 and a tilt latch actuator 28. The tilt latch actuator 28 may, in one or more embodiments, interface with the tilt latch components to open and close tilt latches on the panel on which the lock assembly 20 is located. Tilt latch actuators 28 are known in the art and will not be further described herein, although it should be noted that one potential advantage of the fenestration unit monitoring devices described herein is that, in one or more embodiments, installation of the fenestration unit monitoring devices described herein over an existing fenestration unit lock assembly (such as, e.g., lock assembly 20) will not interfere with or require disconnection/reconnection of the tilt latch actuator 28.

FIG. 7 is a top plan view of the illustrative embodiment of monitor housing 30 located over the lock assembly 20. One feature depicted in this view is rotation of the lock arm 26 and associated cam 27 about axis 21. In particular, the lock arm 26 and cam 27 are rotated to an open position in this view such that cam 27 does not interact with the keeper 24 as depicted in, e.g., FIGS. 3 and 4. Furthermore, the lock arm 26 is, in the open position, not located over the lock arm sensor 50 on the monitor housing 30.

Figure 8:
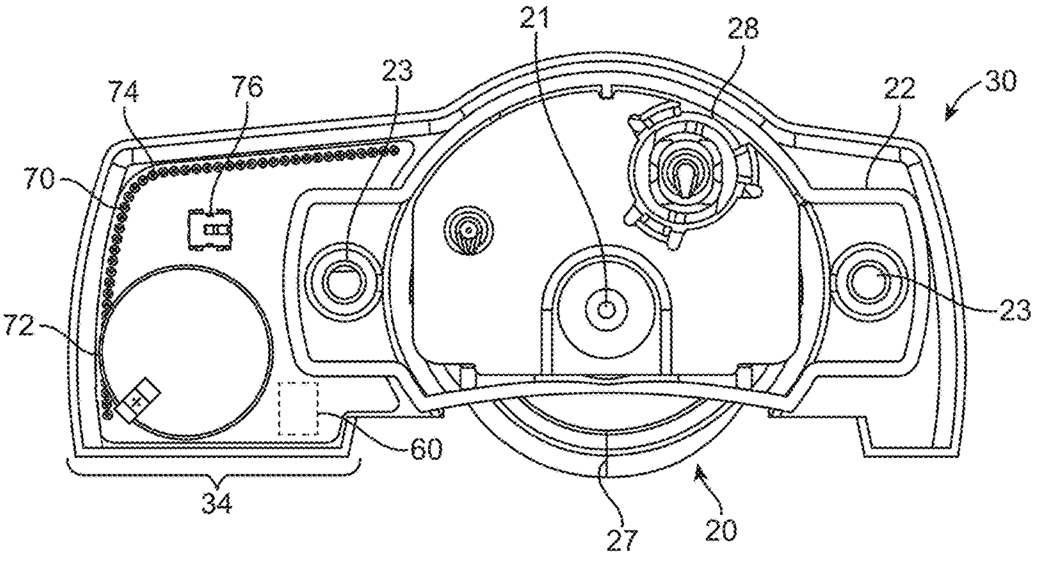
FIG. 8 is a bottom view of the monitor housing of a fenestration unit monitoring device and fenestration unit lock assembly as depicted in FIGS. 6 and 7.

FIG. 8 depicts the underside of the illustrative embodiment of monitor housing 30 and lock assembly 20 as depicted in FIGS. 3-7. The alignment of the base 22 underneath the monitor housing 30 in a lock cavity is seen in this view which also depicts alignment of the lock assembly fastener openings 23 with corresponding monitor fastener openings 33. In this view, the lock arm 26 is located over the monitor housing 30 such that cam 27 is in the locked position and, as a result, lock arm 26 is not seen in FIG. 8 (except for that portion of the lock arm 26 viewed through the left side lock assembly fastener opening 23 in FIG. 8).

Also seen in the view of FIG. 8 is the lock assembly footprint of the lock assembly 20, i.e., the portion of the surface 17 (see, e.g., FIGS. 3 and 4) of the frame member of the panel 16 that is occupied by the base 22 of the lock assembly 20. In one or more embodiments, a portion of the controller cavity 34 may be described as being located over the lock assembly footprint such that, for example, a portion of the lock assembly 20 (e.g., a portion of the base 22) may be located in the controller cavity along with components of the fenestration unit monitoring device as described herein.

Among the features seen in FIG. 8 that may be provided in one or more embodiments of the fenestration unit monitoring devices described herein are a panel position sensor 60, controller 70, power source 72, antenna 74 and tamper switch 76, all of which are, in the depicted embodiment, located in a controller cavity 34 defined within the monitor housing 30.

The panel position sensor 60 may, in one or more embodiments, be positioned to detect the position of a second panel 18 of the fenestration unit 10 relative to the first panel 16. In one or more embodiments, the panel position sensor 60 may be in the form of a magnetically operated reed switch that is configured to sense a trigger in the form of a magnet located on the second panel 18. In one or more alternative embodiments, however, the panel position sensor 60 may be provided in any suitable form that may or may not require a separate trigger to detect the position of the first panel 16 relative to the second panel 18, e.g., a mechanical switch or microswitch operated through interference with a surface on the second panel 18, an acoustical sensor, an RFID device, an optical sensor, a capacitive sensor, direct electrical contacts (e.g., a contact on the upper panel 18 contacts and spans a pair of contacts on the lower panel 16 to complete a circuit), etc.

The fenestration unit monitoring devices described herein include a controller such as, e.g., controller 70 that is operably connected to the lock arm sensor 50, the panel position sensor 60 and the power source 72. In one or more embodiments, the controller 70 may be in the form of one or more microprocessors, dedicated circuits, or any suitable construction capable of receiving signals from the various sensors and operating other devices as described herein. The power source 72 may, in one or more embodiments, be in the form of a battery as depicted in, e.g., FIG. 8, although other power sources such as capacitors, etc. may be used in place of a battery in one or more alternative embodiments of the fenestration unit monitoring devices described herein.

Also depicted in FIG. 8 is an antenna 74 which may be operably connected to a transmitter (not seen in this view) that is operably connected to the controller 70. The transmitter and antenna 74, both of which are, in one or more embodiments, also located in the controller cavity defined by the controller 70, may be used to provide an indication of the status of one or both of a lock signal received from the lock arm sensor 50 and the panel position signal received from the panel position sensor 60, with the one or more control signals being indicative of the status of one or both of the lock signal and the panel position signal. Such transmissions may take the form of codes or control signals as described in, e.g., U.S. Pat. No. 8,624,736 to Gore et al. In one or more embodiments, the antenna 74 may be located entirely between the monitor housing 30 and the surface 17 of the frame member of the first panel 16 on which the monitor housing 30 is located. In one or more alternative embodiments, the antenna 74 may be located entirely within the control cavity 34 in the monitor housing 30. Although the depicted illustrative embodiments include only one antenna, one or more alternative embodiments may include two or more antennas. In still other alternative embodiments, the antenna or antennas may be located outside of the control cavity and/or outside of the monitor housing of a fenestration unit monitoring device as described herein.

The illustrative embodiment of fenestration unit monitoring device depicted in FIG. 8 also includes a tamper switch 76 which may be used to detect removal of the monitor housing 30 from a fenestration unit panel on which it is located. The tamper switch 76 may be operably connected to the controller 70 such that an indication can be provided that the monitor housing was removed from the fenestration unit panel so that appropriate corrective action, if necessary, can be taken.

Figure 9:
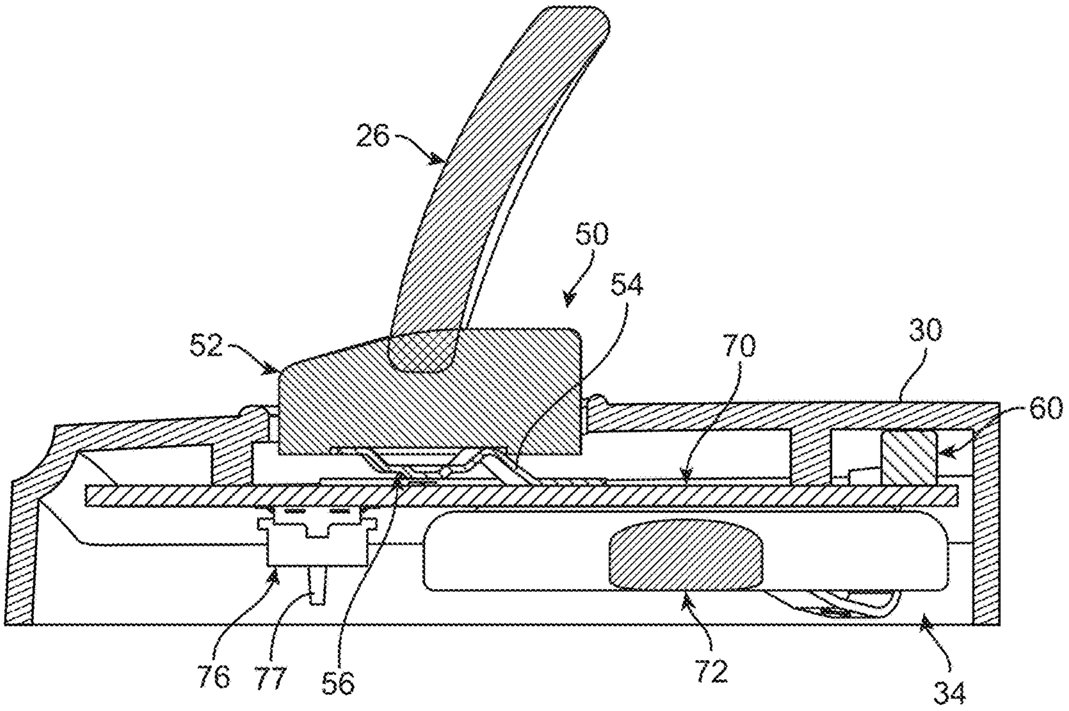
FIG. 9 is an enlarged cross-sectional view of a portion of the monitor housing of FIG. 8 taken along line 9-9 in FIG. 7.

An enlarged cross-sectional view of the controller cavity 34 of the monitor housing 30 is provided in FIG. 9 (with the view of FIG. 9 being taken along line 9-9 in FIG. 7). The cross-sectional view depicts the controller 70, power source 72, panel position sensor 60, lock arm sensor 50 (along with a portion of lock arm 26), and tamper switch 76.

Figure 10:
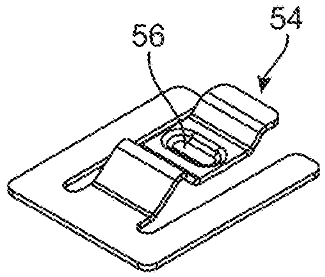
FIG. 10 is a perspective view of one embodiment of a spring member that may be used in one embodiment of a lock arm sensor as described herein.

The lock arm sensor 50 is, in the depicted embodiment, in the form of a mechanically actuated switch including a plunger 52 supported by a spring member 54, one embodiment of which is depicted in FIG. 10. Movement of the lock arm 26 into contact with the plunger 52 of the lock arm sensor 50 causes the spring member 54 to deflect towards the controller 70. The spring member 54 has, in the depicted embodiment a contact surface 56 that is forced against one or more contacts on the controller 70 to open or close a circuit as required to provide a signal to the controller 70 that the lock arm 26 is in position above the lock arm sensor 50 such that the plunger 52 is moved downwardly. The depicted embodiment of lock arm sensor 50 is only one embodiment of many different sensors that could be used to provide a signal to the controller 70 indicative of positioning of the lock arm 26 in the locked position associated with a locked state of the fenestration unit lock assembly as described herein. Some examples of some potentially useful sensor technologies may include, magnetic reed switches, acoustic sensors, RFID devices, optical sensors, capacitive sensors, etc.

The tamper switch 76, in the depicted embodiment, includes a plunger 77 that moves in response to pressure exerted on the plunger by the surface of a frame member of a fenestration unit panel on which the monitor housing 30 is located. Removal of the monitor housing 30 from the frame member of the fenestration unit panel causes plunger 77 two extend away from the controller 70 thereby opening or closing a circuit and providing a signal to the controller 70 that the monitor housing 30 has been removed from a fenestration unit panel.

Figure 11:
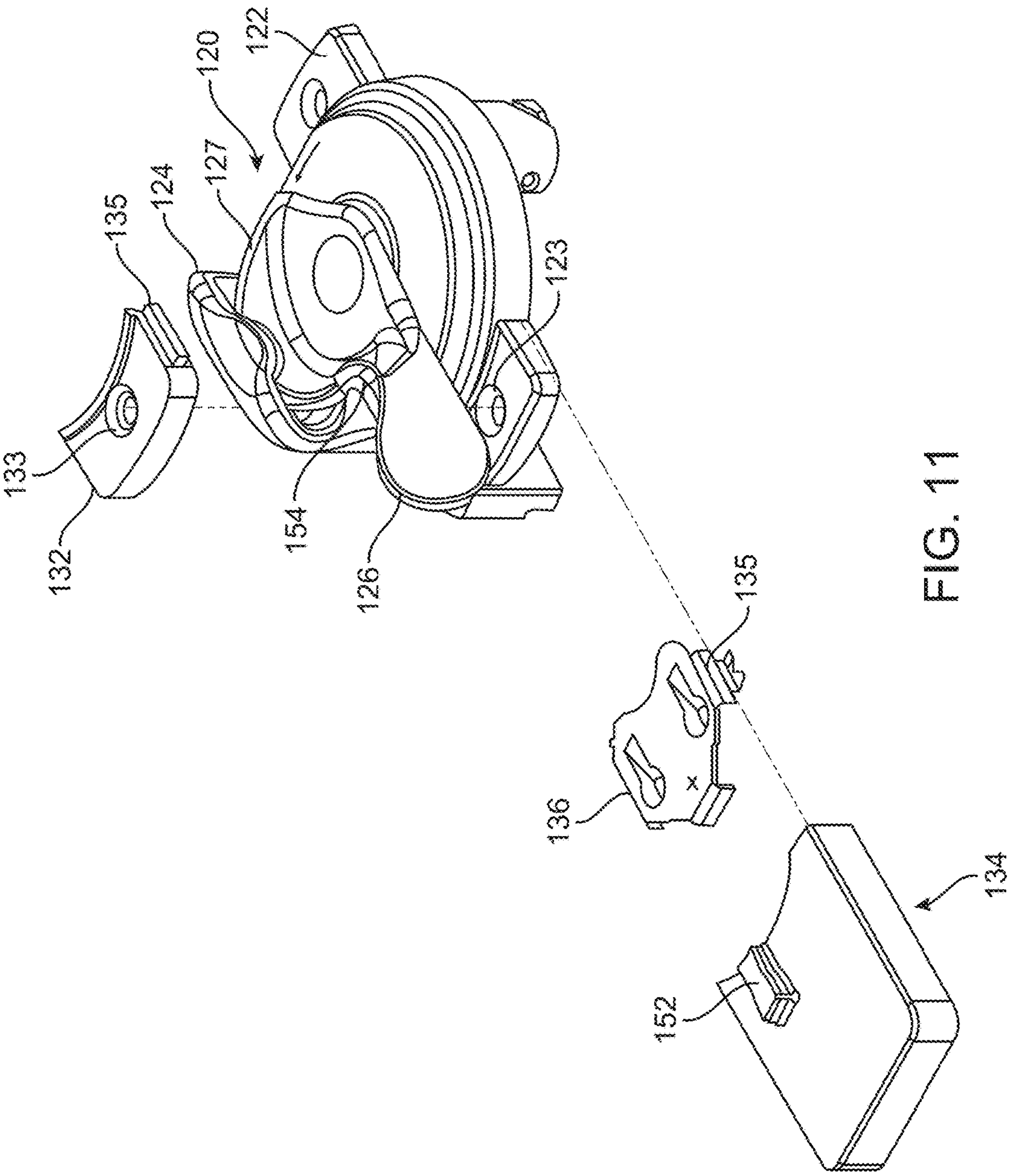
FIG. 11 is an exploded assembly diagram depicting another illustrative embodiment of a fenestration unit monitoring device as described herein.

One alternative illustrative embodiment of a fenestration unit monitoring device as described herein is depicted in the exploded assembly diagram of FIG. 11. The fenestration unit monitoring device is configured for installation over an existing fenestration unit lock assembly 120 that includes a base 122 configured for mounting on a surface of a frame member as described herein, along with a lock arm 126 and cam 127 that cooperates with a keeper 124 to lock a fenestration unit as described herein.

The depicted illustrative embodiment of fenestration unit monitoring device as depicted in FIG. 11 includes a monitor housing base 132 configured for positioning over a portion of the base 122 of the lock assembly 120. In one or more embodiments the monitor housing base 132 may include a fastener opening 133 configured to be aligned with a fastener opening 123 on the base 122 of the lock assembly 120. The illustrative embodiment of the fenestration unit monitoring device depicted in FIG. 11 includes a monitor housing cover 134 configured to be retained on the monitor housing base 132. In one or more embodiments, the monitor housing cover 134 may be attached to the monitor housing base 132 by a snap-fit, interference fit, and/or mechanically interlocking combination of features. For example, in the depicted embodiment, the monitor housing base 132 may include rails 135 that cooperate with corresponding channels (not shown) in the monitor housing cover 134 such that the monitor housing cover 134 is retained in position on the monitor housing base 132 through friction and/or mechanically interlocking structures.

In one or more embodiments, the fenestration unit monitoring device may also include a battery clip 136 configured to fit within monitor housing cover 134 to retain a battery or other power source for use with the fenestration unit monitoring device. In one or more embodiments, the battery clip 136 may include rails 135 similar to those found on the monitor housing base 132.

Although the monitor housings provided in connection with the fenestration unit monitoring devices described herein are described as attached using one or more of: fasteners, snap-fit, interference fit, and/or mechanically interlocking combination of features, in one or more alternative embodiments, the monitor housings used in connection with fenestration unit monitoring devices described herein may be attached using adhesives, including adhesives provided on tapes or other substrates. In essence, any suitable technique or combination of techniques for attaching the components of fenestration unit monitoring devices to an existing lock assembly or proximate an existing lock assembly may be used in connection with the fenestration unit monitoring device described herein.

Figure 12:
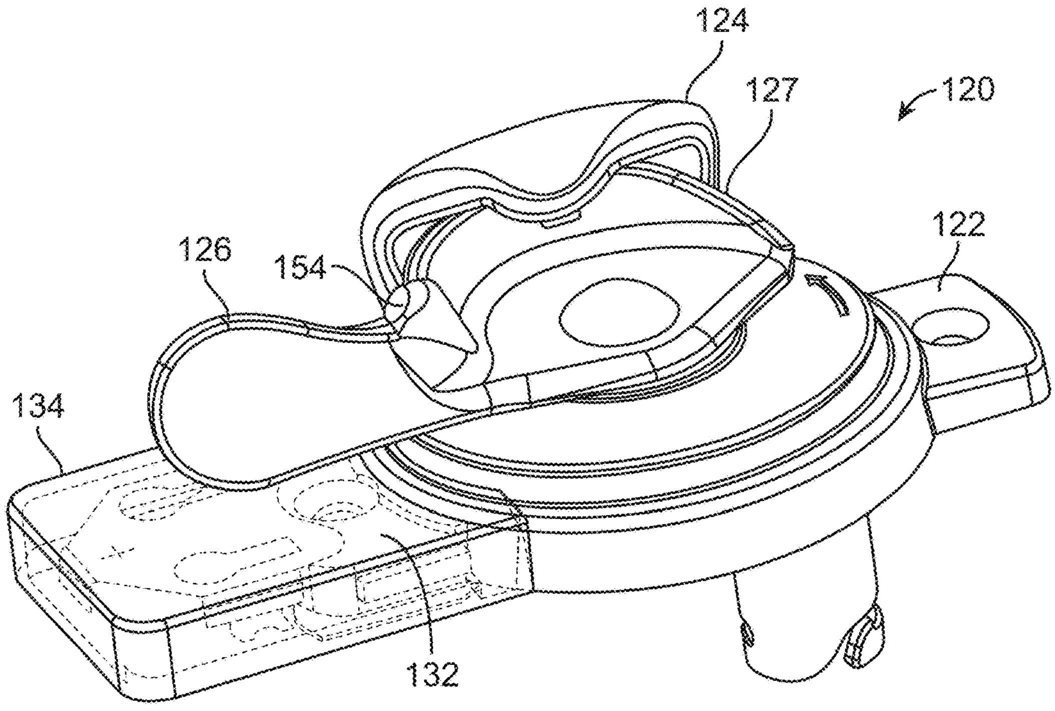
FIGS. 12 and 13 are alternative perspective views of the fenestration unit monitoring device depicted in FIG. 11.
Figure 13:
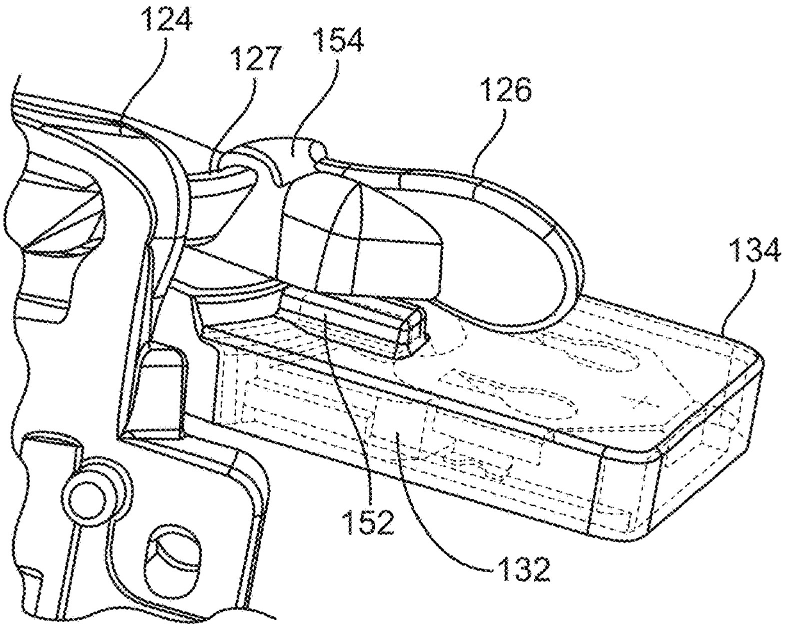

Another optional alternative feature depicted in connection with the fenestration unit monitoring device of FIG. 11 is a lock arm sensor 152 which, in the depicted illustrative embodiment, is provided in the monitor housing cover 134 and a complementary trigger component 154 in the form of a magnet is attached to the lock assembly 120 on the lock arm 126. In one or more embodiments, the lock arm sensor 152 may be in the form of a magnetic reed switch, while the trigger component 154 may be in the form of a permanent magnet. The lock arm sensor 152 and trigger component 154 are, perhaps, best seen in FIGS. 12 and 13, although it should be understood that this implementation of a lock arm sensor and trigger component are only one alternative among many different alternatives that may be used to provide a lock arm sensor in connection with a fenestration unit monitoring device as described herein.

The illustrative embodiments of fenestration unit monitoring devices described herein may include a variety of components. A schematic block diagram including some of the many different components that may be included in the fenestration unit monitoring devices described herein is provided in FIG. 14. As seen there, the fenestration unit monitoring device may include a controller 270 which may be operably connected to a power source 272 as described herein. The controllers used in the fenestration unit monitoring devices described herein may be provided in any suitable form and may, for example, include memory and a control unit. The controllers used in the fenestration unit monitoring apparatus described herein may be provided in any suitable form and may, for example, include memory and a control unit. In one or more embodiments, the control unit of a controller may, for example, be in the form of one or more microprocessors, Field-Programmable Gate Arrays (FPGA), Digital Signal Processors (DSP), microcontrollers, Application Specific Integrated Circuit (ASIC) state machines, etc.

Other components depicted in this diagram include a lock arm sensor 250 panel position sensor 260 and tamper switch 276, all of which are operably connected to the controller 270. Although only the controller 270 is depicted as being operably connected to the power source 272, in one or more alternative embodiments the power source 272 may be directly connected to any of the other components of the fenestration unit monitoring devices described herein which require power in which may use that power without having the power routed through the controller 270.

Figure 14:
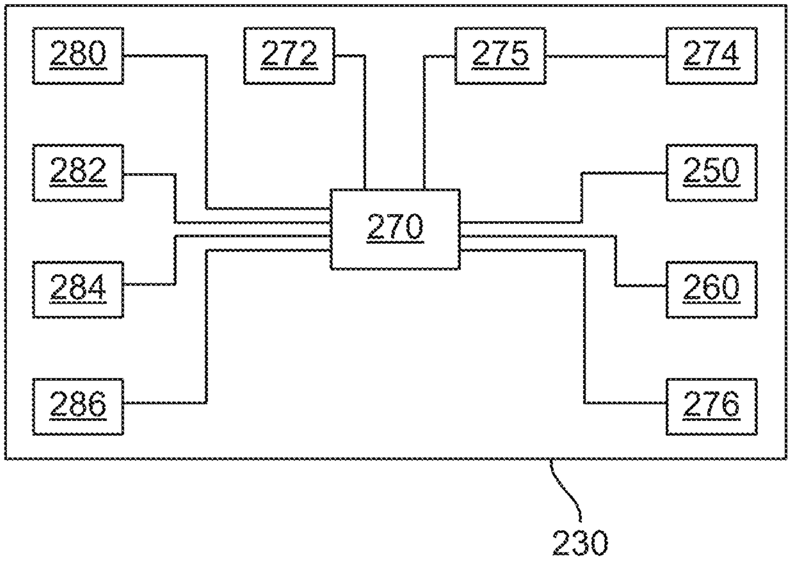
FIG. 14 is a schematic block diagram of components that may be included in one or more embodiments of a fenestration unit monitoring device as described herein.

Also seen in the diagram of FIG. 14 is a transmitter 275 operably connected to the controller 270 and the antenna 274. As discussed herein, the transmitter 275 may be used to transmit one or more control signals indicative of the status of one or more of the signals received by the controller 270 from the various sensors and other devices that may be included in the fenestration unit monitoring devices described herein. Potential examples of some control signals that may be provided using the transmitter 275 and antenna 274 may be described in, e.g., U.S. Pat. No. 8,624,736 to Gore et al. In one or more embodiments, the transmissions may take place using a smart phone or other control wireless control device through any suitable wireless communication protocol (e.g., Bluetooth, ZigBee, a wireless local area network (WLAN), etc.), etc.

Other optional components that may be included in the fenestration unit monitoring devices described herein may include one or more lights 280 (which may, for example, be used to indicate status, etc. of one or more of the sensors and/or the device as a whole), sonic devices 282 which may be used to generate and/or detect sonic energy (e.g., speakers, microphones, etc.), one or more displays 284 which may be used to display alphanumeric or other information (e.g. LCD displays, etc.), and miscellaneous sensors 286 which may include, but are not limited to, temperature sensors, humidity sensors, light sensors, moisture sensors, UV light sensors, wind speed detectors, etc.

Although the fenestration unit monitoring devices described herein may be used in isolation, i.e., to monitor the status of a single fenestration unit, one or more of the fenestration unit monitoring devices described herein may be incorporated into a system which is configured to monitor multiple fenestration units having one or more fenestration unit monitoring devices as described herein mounted thereon. Examples of such systems may be described in, e.g., U.S. Pat. No. 8,624,736 to Gore et al.

As discussed herein, the fenestration unit monitoring devices described herein may be installed over an existing fenestration unit lock assembly. In one embodiment of a method of installing a fenestration unit monitoring device as described herein, the method may include (with reference to, e.g., the illustrative embodiment depicted in FIGS. 3 and 4) removing a fastener attaching the fenestration unit lock assembly 20 to a surface 17 of a frame member of a first panel 16 of the fenestration unit 10. The method may further include positioning a monitor housing 30 on the surface 17 of the frame member of the first panel 16 after removing the fastener such that a portion (e.g., the base 22) of the fenestration unit lock assembly 20 is located within a lock cavity of the monitor housing 30. The lock cavity is defined between the monitor housing 30 and the surface 17 of the frame member when the monitor housing 30 is mounted on the surface 17 of the frame member. The method may further include securing the monitor housing 30 and the fenestration unit lock assembly 20 to the frame member of the first panel 16 using a fastener extending through a monitor fastener opening 33 in the monitor housing 30 that is aligned with a fastener opening 23 in the base 22 of the fenestration unit lock assembly 20 after positioning the monitor housing on the surface of the frame member of the first panel.

The complete disclosure of the patents, patent documents, and publications identified herein are incorporated by reference in their entirety as if each were individually incorporated. To the extent there is a conflict or discrepancy between this document and the disclosure in any such incorporated document, this document will control.

Illustrative embodiments of the fenestration unit monitoring devices and methods are discussed herein some possible variations have been described. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof. It should also be understood that this invention also may be suitably practiced in the absence of any element not specifically disclosed as necessary herein.

What is claimed is:

1. A fenestration unit monitoring device configured for retrofitting an existing fenestration unit lock assembly, the device comprising:

a monitor housing configured for mounting on a surface of a frame member of a first panel after a fenestration unit lock assembly is mounted on the surface of the frame member, monitor housing comprising:

a lock cavity defined between the monitor housing and the surface of the frame member when the monitor housing is mounted on the surface of the frame member, wherein a portion of the fenestration unit lock assembly is located in the lock cavity formed between the monitor housing and the surface of the frame member when the monitor housing is mounted on the surface of the frame member;

optionally, a monitor fastener opening configured to align with a lock assembly fastener opening of the fenestration unit lock assembly when the monitor housing is mounted on the surface of the frame member with the portion of a fenestration unit lock assembly located in the lock cavity, wherein a single fastener can extend through both the monitor fastener opening and the lock assembly fastener opening to secure both the monitor housing and the fenestration unit lock assembly to the frame member of the first panel;

a controller cavity located between the monitor housing and the surface of the frame member when the monitor housing is mounted on the surface of the frame member;

a lock arm sensor operably attached to monitor housing, the lock arm sensor positioned to detect the presence of a lock arm of the fenestration unit lock assembly when the lock arm is in a locked position associated with a locked state of the fenestration unit lock assembly;

a panel position sensor located in the controller cavity of the monitor housing, the panel position sensor configured to detect a position of a second panel of the fenestration unit relative to the first panel;

a controller located in the controller cavity of the monitor housing, wherein the controller is operably connected to the lock arm sensor and the panel position sensor, and further wherein the controller is configured to:

receive a lock signal from the lock arm sensor when the lock arm of the fenestration unit lock assembly is in the locked position associated with the locked state of the fenestration unit lock assembly;

receive a panel position signal from the panel position sensor when the panel position sensor detects presence of the second panel; and provide an indication of a status of one or both of the lock signal and the panel position signal.

2. A device according to claim 1, wherein the device further comprises a transmitter located in the controller cavity and operably connected to the controller, wherein providing an indication of the status of one or both of the lock signal and the panel position signal comprises actuating the transmitter to transmit one or more control signals, wherein the one or more control signals are indicative of the status of one or both of the lock signal and the panel position signal.

3. A device according to claim 2, wherein the transmitter is operably connected to an antenna, and wherein the antenna is located entirely between the monitor housing and the surface of the frame member of the first panel.

4. A device according to claim 2, wherein the transmitter is operably connected to an antenna, and wherein the antenna is located entirely within the controller cavity.

5. A device according to any one of claims 1 to 4, wherein the fenestration unit monitoring device comprises a trigger component mounted on the frame member of the second panel, wherein the panel position sensor is configured to detect the position of the second panel relative to the first panel by detecting the trigger component.

6. A device according to claim 5, wherein the lock arm of the fenestration unit lock assembly is attached to the frame member of the first panel, wherein the fenestration unit lock assembly comprises a keeper mounted on a frame member of the second panel, wherein the trigger component is contained within a trigger component housing, wherein the trigger component housing is located over a portion of the keeper such that the portion of the keeper is located between the trigger component housing and the frame member of the second panel, and further wherein the trigger component housing comprises a trigger housing fastener opening that aligns with a keeper fastener opening of the keeper such that a fastener can extend through both the trigger housing fastener opening and the keeper fastener opening.

7. A device according to claim 1, wherein the fenestration unit lock assembly occupies a lock assembly footprint on the surface of the frame member of the first panel, and wherein a portion of the controller cavity is located over the lock assembly footprint.

8. A device according to claim 1, wherein the lock arm sensor comprises a proximity sensor configured to detect the presence of a lock arm of the fenestration unit lock assembly when the lock arm is in the locked position.

9. A device according to claim 1, wherein the lock arm sensor comprises a contact switch configured to move towards the surface of the frame member on which the monitor housing is mounted when the lock arm of the fenestration unit lock assembly is in the locked position.

10. A device according to claim 1, wherein the lock arm of the fenestration unit lock assembly is attached to the frame member of the first panel and wherein the lock arm rotates into and out of the locked position.

11. A device according to claim 1, wherein the device further comprises a tamper switch movable into and out of a tampered state, wherein the tamper switch is not in the tampered state when the monitor housing is attached to the frame member of the first panel, wherein the tamper switch is operably connected to the controller, and wherein the controller is configured to receive a tamper signal from the tamper switch when the tamper switch is in the tampered state.

12. A method of installing a fenestration unit monitoring device on a fenestration unit that includes an existing fenestration unit lock assembly, the method comprising:

optionally removing a fastener attaching the fenestration unit lock assembly to a surface of a frame member of a first panel of the fenestration unit;

positioning a monitor housing on the surface of the frame member of the first panel (after optionally removing the fastener) such that a portion of the fenestration unit lock assembly is located within a lock cavity of the monitor housing, wherein the lock cavity is defined between the monitor housing and the surface of the frame member when the monitor housing is mounted on the surface of the frame member; and securing the monitor housing and the fenestration unit lock assembly to the frame member (optionally using a fastener extending through a monitor fastener opening in the monitor housing that is aligned with a fastener opening of the fenestration unit lock assembly) after positioning the monitor housing on the surface of the frame member of the first panel.

13. A method according to claim 12, wherein the monitor housing comprises a lock arm sensor operably attached to monitor housing, the lock arm sensor positioned to detect the presence of a lock arm of the fenestration unit lock assembly when the lock arm is in a locked position associated with a locked state of the fenestration unit lock assembly.

14. A method according to claim 12, wherein the monitor housing comprises a controller located in a controller cavity located between the monitor housing and the surface of the frame member when the monitor housing is mounted on the surface of the frame member, and wherein the monitor housing comprises a panel position sensor located in the controller cavity of the monitor housing, the panel position sensor configured to detect a position of a second panel of the fenestration unit relative to the first panel;

wherein the controller:

receives a lock signal from the lock arm sensor when the lock arm of the fenestration unit lock assembly is in the locked position associated with the locked state of the fenestration unit lock assembly;

receives a panel position signal from the panel position sensor when the panel position sensor detects presence of the second panel; and provides an indication of a status of one or both of the lock signal and the panel position signal.

15. A method according to claim 12, wherein the method further comprises transmitting one or more control signals indicative of the status of one or both of the lock signal and the panel position signal using a transmitter operably connected to the controller, wherein the transmitter is located within the controller cavity of the monitor housing.

16. A method according to claim 15, wherein the transmitter is operably connected to an antenna, and wherein the antenna is located entirely between the monitor housing and the surface of the frame member of the first panel.

17. A method according to claim 15, wherein the transmitter is operably connected to an antenna, and wherein the antenna is located entirely within the controller cavity.

18. A method according to claim 12, wherein the method further comprises mounting a trigger component to the frame member of the second panel, wherein the panel position sensor is configured to detect the position of the second panel relative to the first panel by detecting the trigger component.

19. A method according to claim 18, wherein the lock arm of the fenestration unit lock assembly is attached to the frame member of the first panel, wherein the fenestration unit lock assembly comprises a keeper mounted on a frame member of the second panel, wherein the trigger component is contained within a trigger component housing, wherein mounting the trigger component housing comprises mounting the trigger component housing over a portion of the keeper such that the portion of the keeper is located between the trigger component housing and the frame member of the second panel, and further wherein the trigger component housing comprises a trigger housing fastener opening that aligns with a keeper fastener opening of the keeper, wherein the method further comprises inserting a fastener through both the trigger housing fastener opening and the keeper fastener opening to secure both the trigger housing and the keeper to the frame member of the second panel.

20. A method according to claim 12, wherein the fenestration unit lock assembly occupies a lock assembly footprint on the surface of the frame member of the first panel, and wherein positioning the monitor housing on the surface of the frame member of the first panel comprises locating a portion of the controller cavity over the lock assembly footprint.

* * * * *